United States Patent
Gopalakrishnan et al.

(10) Patent No.: US 11,204,821 B1
(45) Date of Patent: Dec. 21, 2021

(54) ERROR RE-LOGGING IN ELECTRONIC SYSTEMS

(71) Applicant: Xilinx, Inc., San Jose, CA (US)

(72) Inventors: Vidya Gopalakrishnan, San Jose, CA (US); Anup Ganesh, Milpitas, CA (US); Chih-Heng Tzang, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 6 days.

(21) Appl. No.: 16/869,041

(22) Filed: May 7, 2020

(51) Int. Cl.
*G06F 11/07* (2006.01)
*G06F 13/42* (2006.01)

(52) U.S. Cl.
CPC ...... *G06F 11/0778* (2013.01); *G06F 11/0745* (2013.01); *G06F 11/0772* (2013.01); *G06F 13/4282* (2013.01); *G06F 2213/0026* (2013.01)

(58) Field of Classification Search
CPC ............ G06F 11/0745; G06F 11/0766; G06F 11/0772; G06F 11/0778; G06F 11/0784; G06F 11/0787; G06F 11/3013; G06F 11/3027; G06F 11/3041; G06F 13/4282; G06F 2213/0026; G05B 23/0264; G05B 23/027; H04L 41/069
See application file for complete search history.

(56) References Cited

U.S. PATENT DOCUMENTS

| | | | | | |
|---|---|---|---|---|---|
| 5,533,193 | A | * | 7/1996 | Roscoe | G06F 11/0733 714/39 |
| 5,768,496 | A | * | 6/1998 | Lidgett | G06F 11/0745 714/25 |
| 6,105,150 | A | * | 8/2000 | Noguchi | G06F 11/0778 714/44 |
| 2003/0070115 | A1 | * | 4/2003 | Nguyen | G06F 11/0787 714/23 |
| 2007/0168740 | A1 | * | 7/2007 | Nilsson | G06F 11/0757 714/38.11 |
| 2008/0126852 | A1 | * | 5/2008 | Brandyberry | G06F 11/0745 714/6.13 |
| 2009/0070387 | A1 | * | 3/2009 | Bouse | G05B 23/0264 |
| 2013/0179732 | A1 | * | 7/2013 | Alanis | G06F 11/079 714/27 |

(Continued)

OTHER PUBLICATIONS

Vivado Design Suite, "UltraScale Devices Gen3 Integrated Block for PCI Express v4.2", PG156, Dec. 19, 2016, available: www.xilinx.com.

*Primary Examiner* — Gabriel Chu
(74) *Attorney, Agent, or Firm* — Crawford Maunu PLLC

(57) ABSTRACT

A disclosed circuit arrangement includes a bus interface circuit and a configuration storage circuit coupled to the bus interface circuit. The bus interface circuit stores first error data in the configuration storage circuit in response to detection of an error condition. A second storage circuit provides storage of data, and an error re-logging circuit is coupled to the configuration storage circuit and to the second storage circuit. The error re-logging circuit polls the configuration storage circuit for the first error data signaling detection of an error, and in response to the first error data signaling detection of an error, stores the first error data in the second storage circuit, and clears the first error data from the configuration storage circuit to remove the signaling of the detection of the error.

16 Claims, 3 Drawing Sheets

(56) References Cited

U.S. PATENT DOCUMENTS

| | | | |
|---|---|---|---|
| 2014/0032965 A1* | 1/2014 | Tsukamoto | G06F 11/0778 714/30 |
| 2014/0068352 A1* | 3/2014 | Matsuura | G06F 11/0757 714/48 |
| 2014/0245076 A1* | 8/2014 | Bansal | G06F 11/366 714/47.1 |
| 2017/0102985 A1* | 4/2017 | Song | G06F 11/079 |
| 2017/0185487 A1* | 6/2017 | Brassac | G06F 11/0778 |

* cited by examiner

ERROR RE-LOGGING IN ELECTRONIC SYSTEMS

TECHNICAL FIELD

The disclosure generally relates to logging of error data.

BACKGROUND

Some System-on-chips (SoCs), all-programmable devices, and field programmable gate arrays (FPGAs) have bus interface circuits that support data transfer between on-chip components. For example, PCIe (Peripheral Component Interface Express) is deployed on many SoC and provides a serial, point-to-point communication channel between components. Bus interface circuits such as PCIe use a dedicated configuration storage circuit to report the occurrence of errors.

Some errors may force the SoC into a state in which the SoC is not responsive to input signals, other than a reset. When the system is unresponsive, the system is sometimes said to be "locked," "frozen," or "hung." In situations in which the SoC is unresponsive, the SoC can be rebooted in response to a reset signal in order to resume operations. However, in resetting the system, the error data logged by PCIe is erased from the bus interface configuration storage circuit. Because the PCIe error information is erased, whether the system freeze is due to a PCIe error or an error in some other part of the SoC cannot be easily determined.

PCIe protocol analyzers are available to monitor PCIe activity. However, such protocol analyzers are expensive and would not be helpful in debugging until the event that triggered the failure is known. That is, a protocol analyzer can indicate a problem in the PCIe link. But until one knows the event that caused a failure, the failure cannot be reproduced by recreating that event. Thus, a protocol analyzer would be of little use until the event that triggered the failure is known.

SUMMARY

A disclosed circuit arrangement includes a bus interface circuit; a configuration storage circuit coupled to the bus interface circuit, where the bus interface circuit is configured to store first error data in the configuration storage circuit in response to detection of an error condition. The circuit arrangement further includes a second storage circuit configured to provide storage of data; and an error re-logging circuit coupled to the configuration storage circuit and to the second storage circuit. The error re-logging circuit is configured to: poll the configuration storage circuit for the first error data signaling detection of an error, and in response to the first error data signaling detection of an error, store the first error data in the second storage circuit, and clear the first error data from the configuration storage circuit to remove the signaling of the detection of the error.

A disclosed method includes storing first error data in a configuration storage circuit of a bus interface circuit in response to detection of an error condition by the bus interface circuit. The method includes polling the configuration storage circuit for the first error data by an error re-logging circuit. The first error data signals detection of an error by the bus interface circuit. The method includes storing the first error data in a second storage circuit by the error re-logging circuit in response to the first error data signaling detection of an error; and clearing the first error data from the configuration storage circuit by the error re-logging circuit to remove the signaling of the detection of the error in response to the first error data signaling detection of an error.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
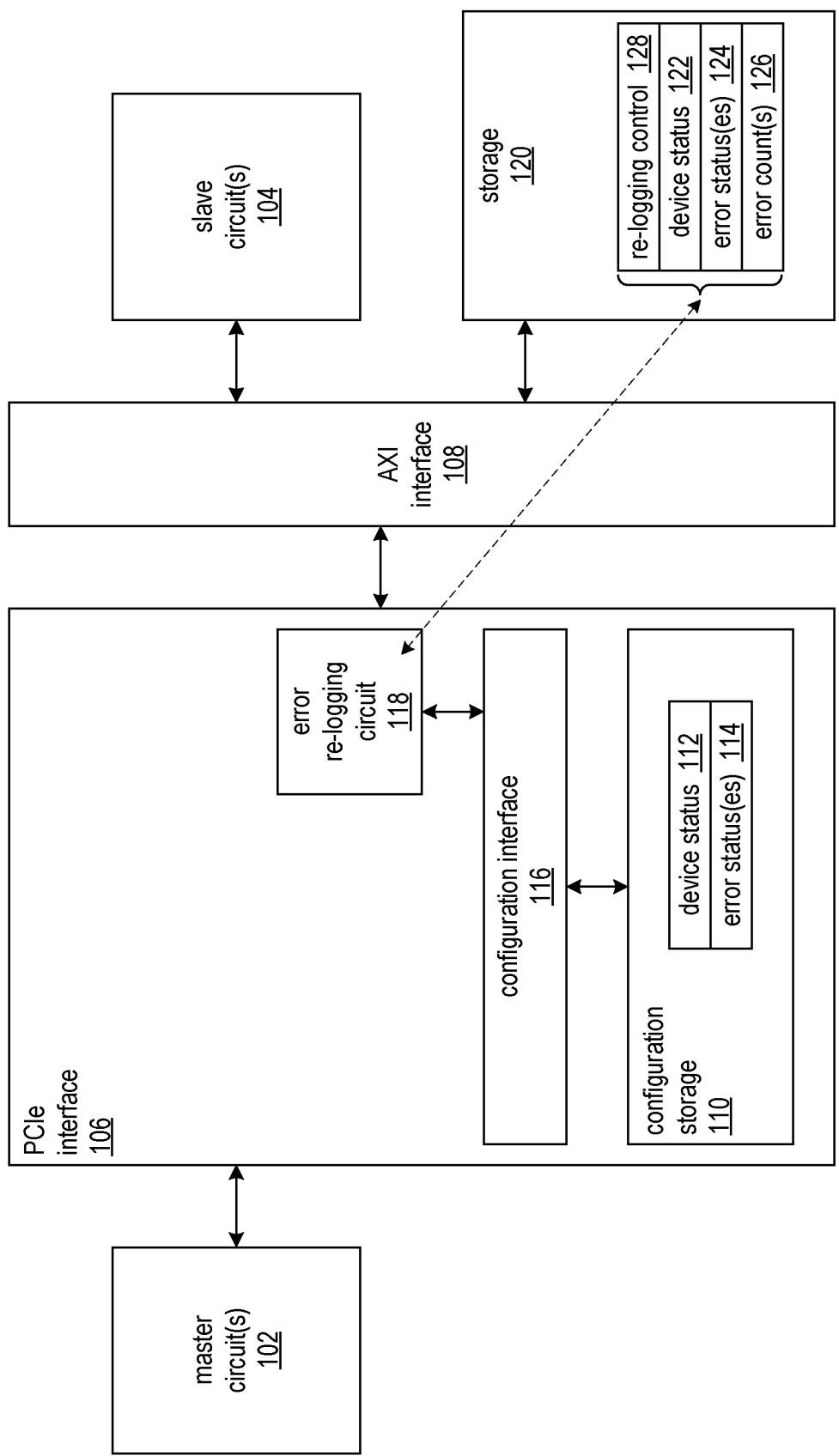
FIG. 1 shows an exemplary circuit arrangement having a bus interface circuit that logs status data to a configuration storage circuit and an error re-logging circuit that polls the configuration storage circuit for error data and re-logs the error data.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods provide an alternative to costly bus analyzers and provide data that can indicate the sources of errors that a bus analyzer cannot. According to the disclosed approaches, a bus interface circuit uses a configuration storage circuit to store error data that signal detection of an error. An error-re-logging circuit monitors storage locations in the configuration storage circuit for error data logged by the bus interface circuit. In response to detecting error data that signal the presence of an error, the error re-logging circuit stores the error data in a second memory circuit that provides storage of data and is impervious to resetting of the bus interface circuit and then modifies the configuration storage circuit to clear the error data signaling of the detection of an error.

FIG. 1 shows an exemplary circuit arrangement having a bus interface circuit that logs error data to a configuration storage circuit and an error re-logging circuit that polls the configuration storage circuit for error data and re-logs the error data. The exemplary circuit arrangement includes a master circuit 102 that is communicatively coupled to a slave circuit 104 via a bus interface circuits 106 and 108. For example, bus interface circuit 106 can implement a point-to-point serial bus such as PCIe, and the bus interface circuit 108 can implement AXI (Advanced eXtensible Interface) or AXI4-Lite protocols. The master circuit can access the storage circuit 120 via the bus interface circuits 106 and 108. The storage circuit 120 can be a RAM of an SoC, such as can be implemented by block RAM (BRAM) in field programmable gate array (FPGA) circuitry, for example.

The bus interface circuit 106 accesses the configuration storage circuit 110 via the configuration interface 116. The configuration interface also provides access to the configuration storage circuit for error re-logging circuit 118. The configuration storage circuit can be implemented as registers or as a RAM, for example. For ease of reference, the storage circuits in which the device status and error data are stored are referred to as the device status register and the error status register(s).

In response to detecting an error condition, the bus interface circuit 106 stores error data in the device status register 112 to signal detection of an error, and stores additional error data in the error status registers 114 to describe the nature of the error. For example, the error data in the error status registers can indicate whether the error is correctable or uncorrectable. In addition, the error data can indicate for an uncorrectable error whether the error is non-fatal or fatal. In the context of PCIe, a correctable error is an error than can affect bus latency and bandwidth but is not associated with loss of data. An uncorrectable non-fatal error indicates an error in which transaction data is lost or corrupted, but the PCIe bus remains operational for other transactions. An uncorrectable fatal error indicates an error in which transaction data is lost or corrupted and the integrity of all transactions is uncertain.

The error status registers 114 can include dedicated registers to describe detected correctable and uncorrectable errors, respectively. In a PCIe bus, one or more of error registers 114 can indicate the occurrence of correctable error types such as Receiver Error Status, Bad TLP Status, Bad DLLP Status, REPLAY_NUM Rollover, Replay Timer Timeout, Advisory Non-Fatal, Corrected Internal, and Header Log Overflow. One or more of error status registers 114 can indicate the occurrence of uncorrectable error types such as Data Link Protocol, Surprise Down, Poisoned TLP, Flow Control Protocol, Completion Timeout, Completer Abort, Unexpected Completion, Receiver Overflow, Malformed TLP, ECRC Error Status, Unsupported Request, ACS Violation, Internal, MC blocked TLP, Atomic egress blocked, and TLP prefix blocked.

In the event of a system freeze, the error data in the configuration storage 110 may be inaccessible. Recovery from the system freeze may involve resetting of the bus interface circuit 106, which clears the error data from the configuration storage. Thus, the cause of the system freeze cannot be diagnosed from directly observing the state error data in the configuration storage. In order to support error analysis, the error re-logging circuit 118 saves the error data, which allows analysis when the configuration storage is inaccessible or the error data has been cleared from the configuration storage.

While the bus interface circuit 106 is operational, the error re-logging circuit 118 polls the device status register 112 for error data that signals detection of an error. The error re-logging circuit can poll the device status register by reading the contents of the register and evaluating the state of the error data. In response to error data in the device status register signaling an error, the error re-logging circuit stores the error data from the device status register 112 of the configuration storage 110 in the device status register 122 of the storage circuit 120, and stores the error data from the error status registers 114 of configuration storage 110 in the error status register(s) 124 of the storage circuit 120. In the exemplary approaches, the error re-logging circuit stores error data from an uncorrectable error status register (not shown) of the error status registers 114 in a corresponding uncorrectable error status register (not shown) in the storage circuit 120 and stores error data from a correctable error status register (not shown) of the error status registers 114 in a corresponding correctable error status register (not shown) in the storage circuit 120.

Further in response to the error data signaling of an error, the error re-logging circuit modifies the error data in the device status register 112 and the error status registers 114 of the configuration storage circuit to clear the data value that signals detection of the error. The error data is cleared in order to allow counting the number(s) of error(s) reported and enable applications to read the saved error information from the storage circuit 120 instead of reading error information from the bus interface configuration storage 110. Enabling applications to read error status information from the bus interface configuration storage 110 is advantageous, because some kernels and drivers clear errors in response to reset of the bus interface, the error data in the configuration storage would not be accessible if the bus interface freezes and would be cleared when the bus interface circuit is reset.

According to one approach, the error re-logging circuit overwrites the current value(s) in the error status register(s) 124. In an alternative approach, the error re-logging circuit can store multiple instances of the error data read at different times in a circular queue in the storage circuit 120.

In addition to writing the error data to the storage circuit 120, the error re-logging circuit 118 counts occurrences of the different types of errors indicated by the error data in the error status registers 114. The error re-logging circuit can store a value indicating the counted number of occurrences of a type of detected error in a corresponding error count register of the error count register 126 in the storage circuit 120. For example, the error re-logging circuit can count respective numbers of uncorrectable errors and correctable errors in response to the error data detected in the uncorrectable error status register and correctable error status register. The counted numbers of uncorrectable and correctable errors can be stored as values in an uncorrectable error count register (not shown) and a correctable error count register (not shown) of the error count registers 126.

The error re-logging circuit can further count occurrences of different types of correctable errors and different types of uncorrectable errors and store the counted occurrences as values in in the respective error count registers (not shown) of the error count registers 126. For example, for a PCIe bus, the error re-logging circuit can count occurrences of correctable error types of Receiver Error Status, Bad TLP Status, Bad DLLP Status, REPLAY_NUM Rollover, Replay Timer Timeout, Advisory Non-Fatal, Corrected Internal, and Header Log Overflow. The error re-logging circuit can count occurrences of uncorrectable error types of Data Link Protocol, Surprise Down, Poisoned TLP, Flow Control Protocol, Completion Timeout, Completer Abort, Unexpected Completion, Receiver Overflow, Malformed TLP, ECRC Error Status, Unsupported Request, ACS Violation, Internal, MC blocked TLP, Atomic egress blocked, and TLP prefix blocked.

According to the disclosed circuits and methods, a re-logging control register 128 is provided. The re-logging control register can be used to signal to the error re-logging circuit 118 when to clear or not clear the contents of the device status register 122, error status register(s) 124, and/or error count register(s) 126. In one approach, the error re-logging circuit reads the re-logging control register in response to a reset signal. Clearing none or one or more of the device status register 122, error status register(s) 124, and/or error count register(s) 126 by the error re-logging circuit is conditioned on the data read from the re-logging control register.

According to one approach, individual bits of data in the re-logging control register can control different clearing options. For example, the state of one bit can control clearing/not clearing all of the device status register 122, error status register(s) 124, and error count register(s) 126. Another bit can control clearing/not clearing the device status register 122 and error status register(s) 124. Another bit can control clearing/not clearing the uncorrectable error count register of the error count registers(s) 126, and another bit can control clearing/not clearing the correctable error count register of the error count registers(s) 126.

The device status register 122, error status register(s) 124, error count register(s) 126, and re-logging control register 128 of the storage circuit 120 are accessible to driver software executing on the master circuit 102, for example. In one approach, the driver is limited to read-only access to the device status register 122, error status register(s) 124, and error count register(s) 126. The driver software is provided with write access to the re-logging control register 128 to provide control over when the error re-logging circuit 118 clears the contents of the device status register 122, error status register(s) 124, and error count register(s) 126.

Figure 2:
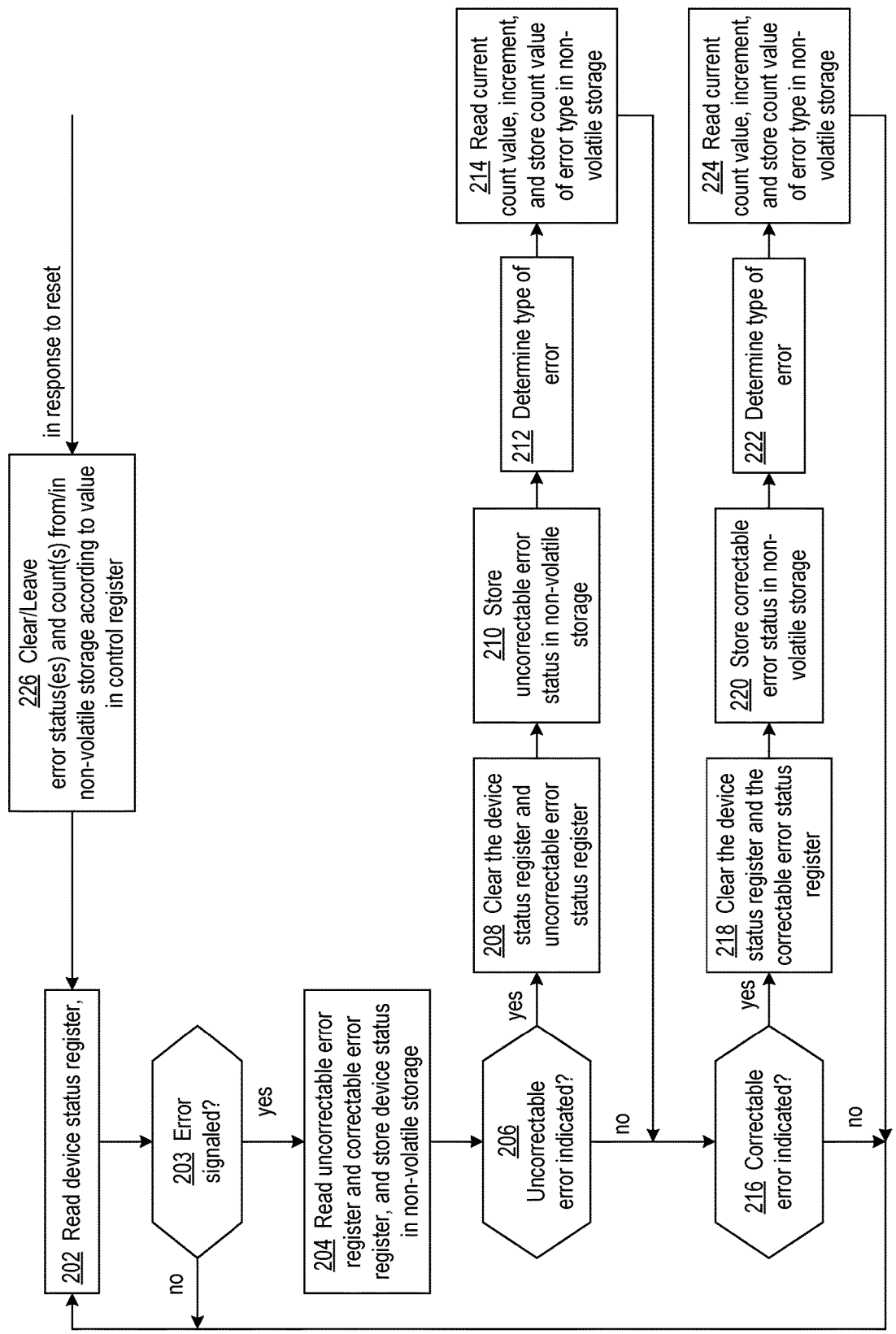
FIG. 2 shows a flowchart of an exemplary process of error re-logging.

FIG. 2 shows a flowchart of an exemplary process of error re-logging. At block 202, the error re-logging circuit 118 (FIG. 1) reads the contents of the device status register 112 (FIG. 1), and at decision block 203 determines whether or not the value read from the device status register signals that an error occurred. In response to the data value not signaling an error, the error re-logging circuit returns to block 202 to continue polling the device status register.

In response to the contents of the device status register signaling that an error was detected, at block 204 the error re-logging circuit reads the contents of the error status register(s) 114 (FIG. 1), such as a correctable error status register and an uncorrectable error status register, and stores the error data from the device status register 112 to the device status register 122 in storage circuit 120.

The error re-logging circuit at decision block 206 determines whether or not the data read from the uncorrectable error status register indicates detection of an uncorrectable error. In response to the data read from the uncorrectable error status register signaling detection of an uncorrectable error, the error re-logging circuit continues at block 208. At block 208, the error re-logging circuit clears the error data from the device status register 112 (FIG. 1) and uncorrectable error status register of the error status registers 114. At block 210, the error re-logging circuit stores the error data from the uncorrectable error status register of the error status registers 114 in the uncorrectable error status register of the error status registers 124 of storage circuit 120.

At blocks 212 and 214, the error re-logging circuit increments the count of the type of uncorrectable error detected. At block 212, the error re-logging circuit determines the type of the uncorrectable error. The types of PCIe uncorrectable errors, for example, are those previously described. At block 214, the error re-logging circuit reads the count value from the uncorrectable error count register associated with the determined error type in storage circuit 120, increments the count, and stores the new count value back in the error status register in the storage circuit 120. The error re-logging circuit continues to decision block 216 to determine if a correctable error was detected.

The error re-logging circuit at decision block 216 determines whether or not the data read from the correctable error status register indicates detection of a correctable error. In response to the data read from the correctable error status register signaling detection of a correctable error, the error re-logging circuit continues at block 218. At block 218, the error re-logging circuit clears the error data from the device status register 112 (FIG. 1) and correctable error status register of the error status registers 114. At block 220, the error re-logging circuit stores the error data from the correctable error status register of the error status registers 114 in the correctable error status register of the error status registers 124 of storage circuit 120.

At blocks 222 and 224, the error re-logging circuit increments the count of the type of correctable error detected. At block 222, the error re-logging circuit determines the type of the correctable error. The types of PCIe correctable errors, for example, are those previously described. At block 224, the error re-logging circuit reads the count value from the correctable error count register associated with the determined error type in storage circuit 120, increments the count, and stores the new count value back in the error status register in the storage circuit 120. The error re-logging circuit continues to block 202 to resume polling the device status register.

Figure 3:
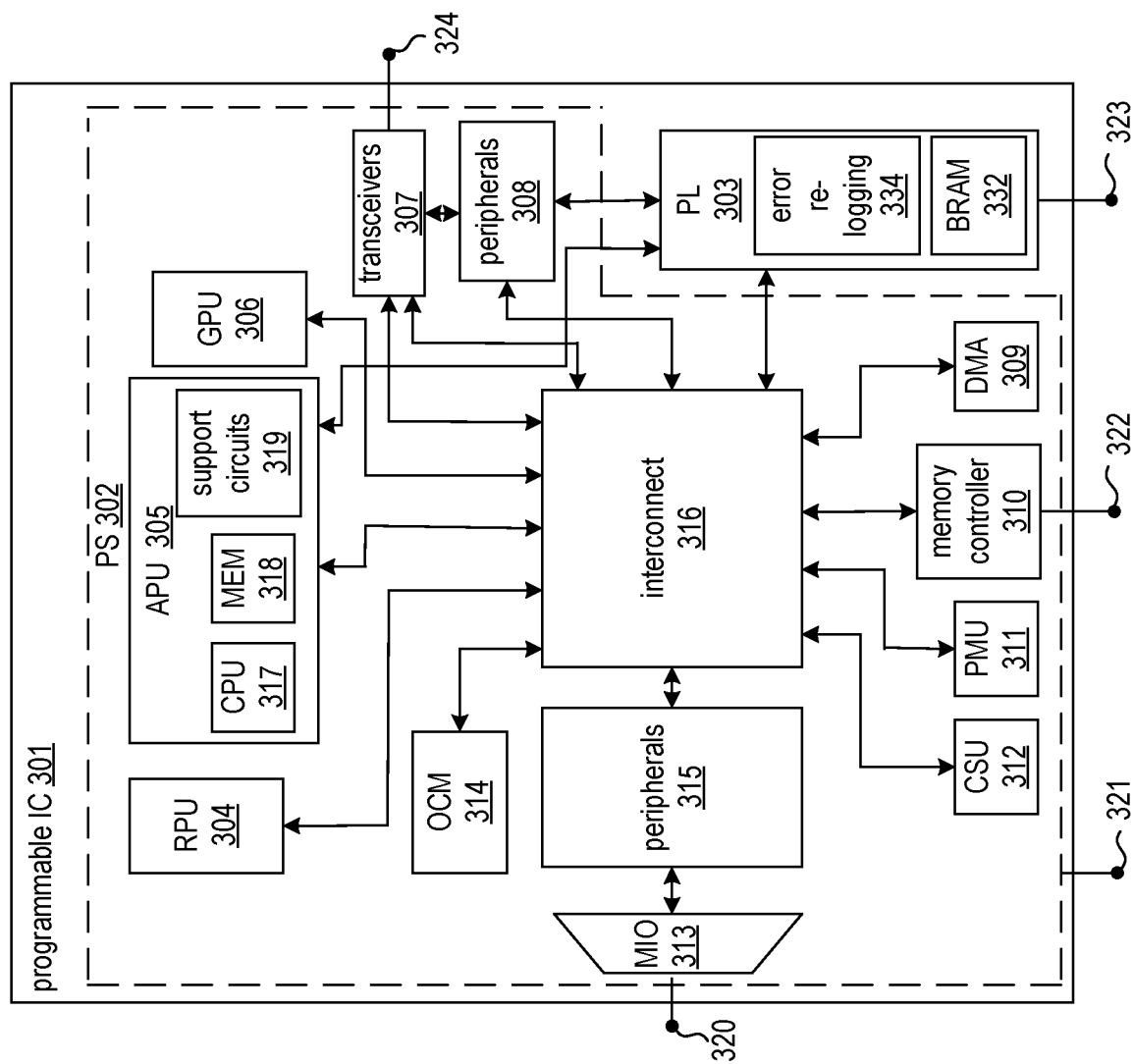
FIG. 3 is a block diagram depicting an exemplary System-on-Chip (SoC) on which the disclosed methods and circuits can be implemented.

FIG. 3 is a block diagram depicting an exemplary System-on-Chip (SoC) 301 on which the disclosed methods and circuits can be implemented. In the example, the SoC includes the processor subsystem (PS) 302 and the programmable logic subsystem 303. The error re-logging circuit 334 can be implemented in the PL subsystem, and the BRAM 332 can implement the storage used by the error re-logging circuit to capture error data and error counts.

The processor subsystem 302 includes various processing units, such as a real-time processing unit (RPU) 304, an application processing unit (APU) 305, a graphics processing unit (GPU) 306, a configuration and security unit (CSU) 312, and a platform management unit (PMU) 311. The PS 302 also includes various support circuits, such as on-chip memory (OCM) 314, transceivers 307, peripherals 308, interconnect 316, DMA circuit 309, memory controller 310, peripherals 315, and multiplexed (MIO) circuit 313. The processing units and the support circuits are interconnected by the interconnect 316. The PL subsystem 303 is also coupled to the interconnect 316. The transceivers 307 are coupled to external pins 324. The PL 303 is coupled to external pins 323. The memory controller 310 is coupled to external pins 322. The MIO 313 is coupled to external pins 320. The PS 302 is generally coupled to external pins 321. The APU 305 can include a CPU 317, memory 318, and support circuits 319. The APU 305 can include other circuitry, including L1 and L2 caches and the like. The RPU 304 can include additional circuitry, such as L1 caches and the like. The interconnect 316 can include cache-coherent interconnect or the like.

Referring to the PS 302, each of the processing units includes one or more central processing units (CPUs) and associated circuits, such as memories, interrupt controllers, direct memory access (DMA) controllers, memory management units (MMUs), floating point units (FPUs), and the like. The interconnect 316 includes various switches, busses, communication links, and the like configured to interconnect the processing units, as well as interconnect the other components in the PS 302 to the processing units.

The OCM 314 includes one or more RAM modules, which can be distributed throughout the PS 302. For example, the OCM 314 can include battery backed RAM (BBRAM), tightly coupled memory (TCM), and the like. The memory controller 310 can include a DRAM interface for accessing external DRAM. The peripherals 308, 315 can include one or more components that provide an interface to the PS 302. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 315 can be coupled to the MIO 313. The peripherals 308 can be coupled to the transceivers 307. The transceivers 307 can include serializer/deserializer (SERDES) circuits, MGTs, and the like.

The processor subsystem 302 can include an interface (not shown) to directly connect with the programmable logic subsystem 303, bypassing the interconnect 316. Such an interface may be implemented, for example, using the AMBA AXI Protocol Specification (AXI) as published by ARM.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for capturing transitory error data. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
    a bus interface circuit;
    a configuration storage circuit coupled to the bus interface circuit, wherein the bus interface circuit is configured to store first error data in the configuration storage circuit in response to detection of an error condition;
    a second storage circuit configured to provide storage of data, wherein the second storage circuit includes a control register; and
    an error re-logging circuit coupled to the configuration storage circuit and to the second storage circuit, the error re-logging circuit configured to:
        poll the configuration storage circuit for the first error data signaling detection of an error, and
        in response to the first error data signaling detection of an error,
            store the first error data in the second storage circuit,
            clear the first error data from the configuration storage circuit to remove the signaling of the detection of the error, and
            conditionally clear the first error data from the second storage circuit in response to state of the control register on a reset signal to the bus interface circuit.

2. The circuit arrangement of claim 1, wherein the bus interface circuit is configured to unconditionally clear the first error data from the configuration storage circuit in response to a reset signal to the bus interface circuit.

3. The circuit arrangement of claim 1, wherein:
    the bus interface circuit is configured to:
        store second error data that describe an uncorrectable error in an uncorrectable error status register of the configuration storage circuit, and
        store third error data that describe a correctable error in a correctable error status register of the configuration storage circuit; and
    the error re-logging circuit is configured to:
        store the second error data from the uncorrectable error status register in a first register in the second storage circuit, and
        store the third error data detected from the correctable error status register in a second register in the second storage circuit.

4. The circuit arrangement of claim 3, wherein:
    the bus interface circuit is configured to store the first error data indicative of the error condition in a device status register of the configuration storage circuit; and
    the error re-logging circuit is configured to store the first error data found in the device status register to a third register in second storage circuit in response to the first error data detected in the device status register.

5. The circuit arrangement of claim 3, wherein the error re-logging circuit is configured to:
    count respective numbers of uncorrectable errors and correctable errors in response to the second error data detected in the uncorrectable error status register and the third error data detected in the correctable error status register; and
    store a count value of the respective number of uncorrectable errors in an uncorrectable error count register of the second storage circuit; and
    store a count value of the respective number of correctable errors in an correctable error count register of the second storage circuit.

6. The circuit arrangement of claim 3, wherein the error re-logging circuit is configured to:
    count respective numbers of different types of uncorrectable errors and respective numbers of different types of correctable errors in response to the second error data detected in the uncorrectable error status register and the third error data detected in correctable error status register;
    store count values of the respective numbers of the different types of uncorrectable errors in respective uncorrectable error count registers of the second storage circuit; and
    store count values of the respective number of the different types correctable errors in respective correctable error count registers of the second storage circuit.

7. The circuit arrangement of claim 3, wherein the error re-logging circuit is configured to:
    poll the uncorrectable error status register of the configuration storage circuit and the correctable error status register of the configuration storage circuit for presence of the second error data and the third error data, respectively;
    store the second error data detected in the uncorrectable error status register to a first register in the second storage circuit;
    store the third error data detected in the correctable error status register to a second register in the second storage circuit;
    count respective numbers of uncorrectable errors and correctable errors in response to the second error data detected in the uncorrectable error status register and the third error data detected in the correctable error status register;
    store a count value of the respective number of uncorrectable errors in an uncorrectable error count register of the second storage circuit;

store a count value of the respective number of correctable errors in an correctable error count register of the second storage circuit; and selectively clear the first register, the second register, the uncorrectable error count register, and the correctable error count register in the second storage circuit in response to state of the control register on a reset signal to the bus interface circuit.

8. The circuit arrangement of claim 1, wherein the bus interface circuit is a point-to-point serial bus.

9. A method comprising:
storing first error data in a configuration storage circuit of a bus interface circuit in response to detection of an error condition by the bus interface circuit;
polling the configuration storage circuit for the first error data by an error re-logging circuit, the first error data signaling detection of an error by the bus interface circuit;
storing the first error data in a second storage circuit by the error re-logging circuit in response to the first error data signaling detection of an error; and
clearing the first error data from the configuration storage circuit by the error re-logging circuit to remove the signaling of the detection of the error in response to the first error data signaling detection of an error;
conditionally clearing the first error data from the second storage circuit by the error re-logging circuit in response to state of a control register of the second storage circuit and in response to a reset signal.

10. The method of claim 9, further comprising unconditionally clearing the first error data from the configuration storage circuit by the bus interface circuit in response to a reset signal.

11. The method of claim 9, further comprising:
storing second error data that describe an uncorrectable error in an uncorrectable error status register of the configuration storage circuit by the bus interface circuit;
storing third error data that describe a correctable error in a correctable error status register of the configuration storage circuit by the bus interface circuit;
storing the second error data from the uncorrectable error status register in a first register in the second storage circuit by the error re-logging circuit; and
storing the third error data detected from the correctable error status register in a second register in the second storage circuit by the error re-logging circuit.

12. The method of claim 11, further comprising:
storing the first error data indicative of the error condition in a device status register of the configuration storage circuit by the bus interface circuit; and
storing the first error data found in the device status register in a third register in second storage circuit by the error re-logging circuit in response to the first error data detected in the device status register.

13. The method of claim 11, further comprising:
counting respective numbers of uncorrectable errors and correctable errors by the error re-logging circuit in response to the second error data detected in the uncorrectable error status register and the third error data detected in the correctable error status register;
storing a count value of the respective number of uncorrectable errors in an uncorrectable error count register of the second storage circuit by the error re-logging circuit; and
storing a count value of the respective number of correctable errors in an correctable error count register of the second storage circuit by the error re-logging circuit.

14. The method of claim 11, further comprising:
counting respective numbers of different types of uncorrectable errors and respective numbers of different types of correctable errors by the error re-logging circuit in response to the second error data detected in the uncorrectable error status register and the third error data detected in correctable error status register;
storing count values of the respective numbers of the different types of uncorrectable errors in respective uncorrectable error count registers of the second storage circuit by the error re-logging circuit; and
storing count values of the respective number of the different types correctable errors in respective correctable error count registers of the second storage circuit by the error re-logging circuit.

15. The method of claim 11, further comprising:
polling the uncorrectable error status register of the configuration storage circuit and the correctable error status register of the configuration storage circuit by the error re-logging circuit for presence of the second error data and the third error data, respectively;
storing the second error data detected in the uncorrectable error status register to a first register in the second storage circuit by the error re-logging circuit;
storing the third error data detected in the correctable error status register in a second register in the second storage circuit by the error re-logging circuit;
counting respective numbers of uncorrectable errors and correctable errors by the error re-logging circuit in response to the second error data detected in the uncorrectable error status register and the third error data detected in the correctable error status register;
storing a count value of the respective number of uncorrectable errors in an uncorrectable error count register of the second storage circuit by the error re-logging circuit;
storing a count value of the respective number of correctable errors in an correctable error count register of the second storage circuit by the error re-logging circuit; and
selectively clearing the first register, the second register, the uncorrectable error count register, and the correctable error count register in the second storage circuit by the error re-logging circuit in response to state of the control register of the second storage circuit on a reset signal to the bus interface circuit.

16. The method of claim 9, further comprising providing point-to-point serial communications by the bus interface circuit.

* * * * *